3,209,018
SILARYLENESILANES, CYCLOTRISILOXANES, AND THE PREPARATION OF SILANOLS
Robert L. Merker, Pittsburgh, Pa., assignor to The Dow Corning Corporation, Midland, Mich., a corporation of Michigan
No Drawing. Filed July 22, 1960, Ser. No. 44,534
7 Claims. (Cl. 260—448.2)

This invention relates to certain silarylenesilanes, methods for their production and for the preparation of silanols therefrom, and corresponding cyclic trisiloxanes. It also relates to improvements in the process for producing linear silarylenesiloxane polymers.

The arylene radicals which link the two silicon atoms present in the monomeric silanes of this invention all are radicals in which the attached silicon atoms are in a para position, or a position comparable to the para position. Each silicon atom has one hydrogen atom bonded thereto as the only reactive substituent present. In the silarylenesilanes which have been made in the past, the reactive substituents attached to both silicon atoms have been halogen or alkoxy substituents. The preparation of such materials was by processes in which the yields of product were far too low to have any commercial practicability whatsoever.

It is an object of the present invention to prepare novel reactive silarylenesilanes and to provide techniques for their preparation by which commercially practical yields are obtained. Further objects of the invention are to provide readily purified reactive silarylenesilanes and the corresponding cyclic siloxane derivatives thereof. Other objects and advantages will be apparent from the following description.

The silarylenesilanes of this invention are those of the formula $HR_2SiR'SiR_2H$ where each R is a monovalent hydrocarbon radical free of aliphatic unsaturation and R' is a divalent radical selected from the group consisting of p-phenylene, 4,4'-biphenylene, 4,4'-diphenylene ether, p-xylylene and 4,4'-dimethylenediphenyl ether radicals. These compounds can be depicted by the following respective structural formulae:

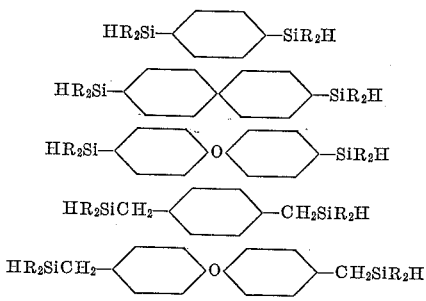

The cyclosiloxanes of the invention are of the formula

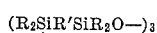

$$(R_2SiR'SiR_2O—)_3$$

where R and R' are as above defined.

It has been found that the silanes of this invention can be prepared in good yield by what may be called an "in situ Grignard" technique. In this technique, no attempt is made to prepare a Grignard reagent separately or as such. The method comprises reacting (1) an organodihalide of the formula $XR'X$, where R' is a divalent radical as defined above and X is a halogen atom selected from the group consisting of chlorine and bromine, with (2) magnesium, and (3) a silane of the formula $R_2HSiX$ where each R is a monovalent hydrocarbon radical free of aliphatic unsaturation and X is as above defined, by adding (1) to the magnesium in the presence of an amount of (3) which is at least equivalent to the amount of (1).

The R radicals in the compounds and method which have been described above can be any monovalent hydrocarbon radicals and can be the same or different from one another. Suitable R radicals include alkyl radicals such as methyl, ethyl, and octadecyl; aryl radicals such as phenyl, xenyl and naphthyl radicals; aralkyl radicals such as benzyl; alkaryl radicals such as tolyl and xylyl; and cycloalkyl radicals such as cyclohexyl. Methyl, ethyl, and phenyl radicals are most preferred.

Of the various specific R' radicals which have been defined above, the p-phenylene radical is the most preferred. This is true both from the standpoint of the ease and expense of preparation, and from the standpoint of the thermal stability of the siloxanes which can be prepared from the silanes.

In the preparation of the defined silanes, either of two slightly different but related methods can be used. In the first method, a mixture of the halosilane $R_2HSiX$ and the organodihalide $XR'X$ is prepared, and this mixture is added directly to magnesium under conditions which are otherwise the conventional conditions for preparing Grignard reagents. The magnesium is of course employed in a form which provides a high surface area, i.e. in the form of chips, granules, powder or the like. Although not absolutely necessary, it is preferable that an inert solvent be present in order to provide maximum contact and handling ease. Conventional Grignard solvents can be employed for this purpose, as illustrated by ethers such as diethylether or any other relatively anhydrous solvent of a type which does not itself react with Grignard reagents (e.g. toluene, xylene, or the like). Solvents which may theoretically form Grignard complexes are considered inert under the meaning of that term intended here, for they do not destroy the reactivity of the reagent. Of course more than one solvent can be used if desired.

By far the most preferred solvent for the above reaction is tetrahydrofuran, and under most conditions this solvent consistently produces the best yield of product. As is well known in Grignard type preparations, the optimum conditions will vary with the particular organodihalide employed and with the stage of the reaction. In other words, it may require a somewhat elevated temperature to initiate a reaction, but once the reaction has begun it will be found to continue at a rapid pace under practically any conditions wherein the reactants other than the magnesium are in a liquid phase. If desired, the conventional trace of iodine or a highly reactive halide such as methyl bromide can be added to the magnesium at the very beginning of the reaction in order to activate the system. Once the reaction is initiated, it can ordinarily be controlled by controlling the rate of addition of the reactants to the magnesium, but external cooling can be applied if desired to permit a rapid rate of addition. Ordinarily it will be preferable to carry out the reaction at temperatures ranging from 25° to 150° C., and atmospheric or superatmospheric pressures can be used as desired.

The silane $R_2HSiX$ should be present during the reaction in an amount at least equivalent to the amount of $XR'X$ present (2 mols of the silane being considered equivalent to 1 mol of $XR'X$). Preferably this silane is present in 10 to 100 percent excess of the equivalent amount. Any amount of magnesium can be used, but for efficiency it is preferred that it too be present in at least an amount equivalent to the total $XR'X$ compound to be used (i.e., 2 mols Mg per mol $XR'X$).

In the second type of process for the preparation of the defined silanes, the reaction conditions are the same as discussed above. This second technique, however, is characterized by the fact that the magnesium is mixed with the halosilane reactant and the organodihalide is added to the mixture so prepared. If an inert solvent is used, it can be mixed with either the halosilane or the organodihalide or both.

The cyclic trisiloxanes of this invention are of the formula

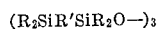

(R₂SiR'SiR₂O—)₃

They are called trisiloxanes herein in spite of the six silicon atoms because there are only three siloxane linkages. They can be prepared by first hydrolyzing and condensing the silanes of this invention, preferably with a mixture of water and ethanol and preferably using an alkali metal hydroxide such as KOH as the catalyst. This produces a siloxane of intermediate molecular weight, and the latter is then subjected to thermal "cracking" in the presence of a catalytic quantity of LiOH, distilling out the cyclic under reduced pressure. The cyclic siloxane so produced can be polymerized by heating it in the presence of any conventional siloxane polymerization catalyst (for example, alkali metal hydroxides or alkali metal salts of silanols or siloxanols), thus producing high molecular weight linear polymers.

The silanes of this invention can be converted to corresponding alkoxysilanes by reacting them with the appropriate alcohol in the presence of a catalytic quantity (preferably 0.01 to 1 percent by weight based on the weight of the silane) of metallic sodium. Conventional techniques can be used for this alcoholysis. Alcohols of from 1 to 5 inclusive carbon atoms and reaction temperatures of about 50° to 150° C. are preferred. It is best to use an amount of alcohol at least equivalent to the silicon-bonded hydrogen, and preferably an excess is present.

The above alkoxysilanes can be converted to the corresponding silanols [i.e. the silarylenesilane diols, (HO)R₂SiR'SiR₂(OH)] by hydrolysis with water, preferably in the presence of an alkali metal hydroxide, ammonium hydroxide, or pyridine. There is no particular need to isolate the alkoxysilane prior to hydrolysis. In using an alkali metal hydroxide, the preferred technique is the same as that shown immediately below.

The silanols can be prepared directly from the silanes of this invention without going through the intermediate alkoxysilane by hydrolyzing the hydrogenosilane with a relatively strong solution of an alkali metal hydroxide (preferably NaOH or KOH) in alcohol and water, followed by neutralization of the reaction product. The reaction takes place at room temperature, but temperatures of 50° to 150° C. are preferred. The concentration of the alkali metal hydroxide should be at least 5 percent by weight and about 7 to 15 percent is preferable. Aliphatic alcohols of from 1 to 3 inclusive carbon atoms give the best results. The ratio of alcohol to water is not critical, but should ordinarily range from about 9:1 to 1:9. The amount of solution employed is preferably sufficient to provide at least an equivalent of the alkili metal hydroxide, i.e., 2 mols per mol of HR₂SiR'SiR₂H, along with an excess of both water and alcohol. Neutralization is best accomplished with a water soluble acid or acid salt, e.g., acetic acid or potassium acid phosphate. It is interesting to note that the use of weaker solutions of alkali metal hydroxide (e.g. about 1 percent) in the above described reaction results in the formation of intermediate molecular weight polymers rather than silanols.

The silanol products discussed above can be polymerized to high molecular weight silarylenesiloxane polymers by heating them in the presence of catalytic quantities of alkali metal hyroxides, as has been described in United States Patent No. 2,562,000, issued July 24, 1951. Preferred catalysts for such a polymerization, however, are the amine salts of carboxylic acids, as described in the copending Hyde application Serial No. 826,421 filed July 13, 1959. The polymers prepared by the polymerization of either the silanols or the cyclic siloxanes are linear orientable polymers which can be drawn into fibers, cast in molds to produce shaped articles, or formed into films, as noted in the aforesaid patent. The silanols and cyclic siloxanes can also be copolymerized with conventional organosiloxanes such as the well known cyclic or polymeric forms of dimethylsiloxane, methylphenylsiloxane, etc., using conventional organosiloxane polymerization catalysts, to produce copolymers which can be fabricated by the usual techniques into organosilicon rubber.

The following examples are illustrative only. The symbols Me, Et, and Ph have been used to represent methyl, ethyl, and phenyl radicals respectively. All parts are parts by weight unless otherwise indicated.

*Example 1*

A solution of 177 grams (0.75 mol) p-dibromobenzene and 177 grams (1.875 mols) Me₂HSiCl in 410 ml. of tetrahydrofuran was slowly added to a mixture of 36.5 grams (1.5 g. atoms) magnesium and 40 ml. tetrahydrofuran. The reaction was exothermic and a precipitate formed as the reaction proceeded. When the addition was complete the reaction mass was heated at reflux temperature for one hour and the reaction products were poured over cracked ice. The organic layer was separated and diluted with hexane, washed with water, and dried over anhydrous sodium sulfate. Fractional distillation provided the compound

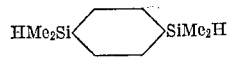

in a yield of 44.8 percent of theoretical. This compound boiled at 112° to 113° C./29 mm. Hg, $n_D{}^{25}$ 1.5007, $d_{25°}$ 0.8832.

*Example 2*

A solution of 177 grams (0.75 mol) p-dibromobenzene in 300 ml. tetrahydrofuran was added slowly to a mixture of 36.5 grams (1.5 g. atoms) magnesium, 212.5 grams (2.25 mols) Me₂HSiCl, and 180 ml. tetrahydrofuran. The reaction mass was refluxed for one hour and worked up as described in Example 1 to provide a 65.9 percent yield of

*Example 3*

A solution of 70 grams p-dibromobenzene and 53.1 grams Me₂HSiCl in 160 ml. diethylether was added slowly to a mixture of 14.4 grams magnesium and 50 ml. tetrahydrofuran. The reaction product was worked up as in Examples 1 and 2 and distillation provided a 29.2 percent yield of the same product.

*Example 4*

By using the technique of Example 2, but changing the organodihalide or the silane reactants employed, the compounds shown below were prepared.

(a) The use of p-dibromobenzene and MePhSiHCl produced a 46.5 percent yield of

boiling at 188° C./1.4 mm. Hg, $d_4{}^{25}$ 1.027.

(b) The use of p-dibromobenzene and an equimolar mixture of Me₂HSiCl and MePhSiHCl produced a mixture of silane products, approximately 50 molar percent of which was the compound

obtained in about 53 percent of the theoretical yield, boiling at about 178° C./22 mm. Hg, $n_D{}^{25}$ 1.545.

(c) The use of p-dibromobenzene and Ph₂HSiCl provided a 25 percent yield of the compound

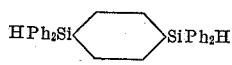

M.P. 105° to 107° C.

(d) The use of 4,4'-dibromobiphenyl and Me₂HSiCl provided a 20 percent yield of the compound

boiling at 140° to 141° C./0.85 mm. Hg, $d_4^{25}$ 0.963, $n_D^{25}$ 1.5724.

(e) The use of bis-(p-bromophenyl)ether and Me₂HSiCl provided 68 percent of the theoretical yield of the compound

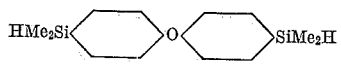

boiling at 132° C./0.5 mm. Hg, $d_4^{25}$ 0.976, $n_D^{25}$ 1.5478.

(f) The use of bis-(p-chloromethylphenyl)ether and Me₂HSiCl provided a 93 percent yield of the compound

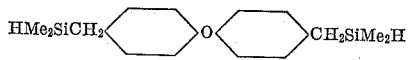

boiling at 155° C./0.6 mm. Hg, $d_4^{25}$ 0.971, $n_D^{25}$ 1.5429.

(g) The use of p-xylene dichloride and Me₂HSiCl provided a 73 percent yield of

boiling at 132° C./20 mm. Hg, $n_D^{25}$ 1.5012, $d_{25°}$ 0.828

Example 5

(a) A mixture of 17.7 grams water, 309 ml. ethanol and 1 gram KOH was heated to reflux temperature and 66.1 grams

was slowly added thereto. Most of the ethanol in the reaction mass was distilled off and the precipitate which had formed was separated by filtration to provide a white powdery siloxane polymer. This polymer was still soluble in benzene and was found to have a molecular weight of about 2200.

(b) A mixture of 49 grams of the above white powdery polymer, 40 grams toluene, and 1 gram NaOH was heated at reflux temperature for 1 hour while a trace of water was being removed through an azeotrope trap. The toluene was then distilled off and the residue was heated at ultimate vacuum to crack out the cyclic dimer of the formula

This material was recrystallized from absolute ethanol to produce white, cotton-like crystals having a melting point of 208° C.

(c) Another batch of the white powdery siloxane of intermediate molecular weight was prepared in the same manner as described in (a) above. This polymer was then treated as in (b) above except that LiOH was used rather than NaOH. The cyclic which was cracked and distilled out of this reaction mass was found to be largely the cyclic trimer of the formula

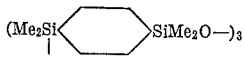

contaminated with a small amount of the cyclic dimer.

(d) A mixture of the cyclic trimer and dimer as prepared in (c) above, was heated at 180° C. in the presence of 0.01 percent by weight of potassium dimethylsilanolate. Within 15 minutes the viscosity of the siloxane mixture was greatly increased and within 5 hours a very high molecular weight, tough, solid polymer was produced.

Example 6

The alkoxysilane

was prepared by heating a mixture of 200 ml. absolute ethanol and about 1 gram metallic sodium at reflux temperature while 194 grams

was slowly added thereto. When the evolution of hydrogen had ceased, the crude reaction product was poured with constant stirring into a mixture of 116 grams NaOH, 700 ml. methanol and 77 ml. water. An additional 116 grams NaOH dissolved in 777 ml. water was added to the mass, and after standing for 30 minutes the entire mixture was poured into an ice water solution containing 1,030 grams KH₂PO₄. A precipitate formed immediately. It was removed by filtration, dissolved in tetrahydrofuran and washed with water. The solvents were evaporated to provide a crude crystalline product which upon recrystallization from a 50:50 mixture of hexane and tetrahydrofuran provided 85 percent of the theoretical yield of the silarylenesilane diol

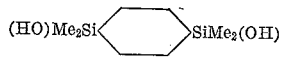

M.P. 139° C.

Using the same process, but starting with

as the silane reactant, there was obtained a 65 percent yield of

M.P. 118.5 to 119° C.

Example 7

10 parts of absolute ethanol and 5 parts of

were reacted in the presence of a trace of metallic sodium as in Example 6 above. The crude reaction mixture was neutralized with glacial acetic acid and then 2 parts concentrated ammonium hydroxide and 0.7 part water were added and the mixture allowed to stand for 5 days. The solvents and ammonia were evaporated and the crystalline product was recrystallized to provide a 27.6 percent yield of

The above preparation was repeated except that after neutralization with acetic acid, 2 parts pyridine and 4 parts water were added and the mixture allowed to stand for 5 days. This provided a 40 percent yield of the recrystallized

When the same process was repeated except that 14 parts pyridine was employed rather than the 2 parts previously used, the yield of product was 74 percent of theoretical.

Example 8

A solution of 10 parts KOH, 50 parts water, and 40 parts absolute ethanol was prepared and 10 parts

was added thereto. After standing for 30 minutes, the resulting solution was neutralized with glacial acetic acid and excess water added. The precipitate which formed was separated by filtration and recrystallized to provide a 43 percent yield of

Example 9

A solution of 0.55 parts n-hexylamine 2-ethylhexoate in 25 parts benzene was added to 50 parts

and the mixture was heated at 83° C. under reflux while water was removed by way of an azeotrope trap. After 1 hour of refluxing, sufficient benzene was distilled off to raise the pot temperature to 140° C. Refluxing was continued for about 4 hours to remove the theoretical quantity of water from the system. The benzene was evaporated from the solution and the residue was heated at 150° C. for 2 hours under ultimate vacuum to produce a tough, fiber-forming polymeric siloxane of the unit formula

That which is claimed is:

1. A silarylenesilane of the formula

HMePhSiR'SiMePhH where R' represents a p-phenylene radical and Me and Ph represents methyl and phenyl radicals respectively.

2. A silarylenesilane of the formula

HMe₂SiR'SiMePhH where R' represents a p-penylene radical and Me and Ph represent methyl and phenyl radicals respectively.

3. A silarylenesilane of the formula HPh₂Sir'SiPh₂H where R' represents a p-phenylene radical and Ph represents a phenyl radical.

4. A cyclotrisiloxane of the formula

where R' represents a p-phenylene radical and each R is selected from the group consisting of methyl and phenyl radicals.

5. A process for producing a silarylenesilane diol having the formula (HO)R₂SiR'SiR₂(OH), where each R is a monovalent hydrocarbon radical free of aliphatic unsaturation and R' is a divalent radical selected from the group consisting of p-phenylene, 4,4'-biphenylene, 4,4'-diphenylene ether, p - xylylene, and 4,4' - dimethylenediphenyl ether radicals which comprises subjecting a compound of the formula HR₂SiR'SiR₂H where R and R' are as above defined, to alcoholysis whereby the silicon-bonded hydrogen atoms are replaced by alkoxy groups, and hydrolyzing said alkoxy groups under conditions such that substantially all of said alkoxy groups are replaced by silicon-bonded hydroxy groups.

6. A process for producing a silarylenesilane diol having the formula (HO)R₂SiR'SiR₂(OH), where each R is a monovalent hydrocarbon radical free of aliphatic unsaturation and R' is a divalent radical selected from the group consisting of p-phenylene, 4,4'-biphenylene, 4,4'-diphenylene ether, p-xylylene, and 4,4'-dimethylenediphenyl ether radicals, which comprises hydrolyzing HR₂SiR'SiR₂H, where R and R' are as above defined, in the presence of at least an equivalent amount of an alkali metal hydroxide, and neutralizing the resulting alkaline hydrolyzate with a quantity of a water soluble acid which is at least equivalent to the amount of alkali metal hydroxide employed.

7. A process for the preparation of a silarylenesilane diol of the formula (HO)R₂SiR'SiR₂(OH), where each R is a monovalent hydrocarbon radical free of aliphatic unsaturation and R' is a divalent radical selected from the group consisting of p-phenylene, 4,4'-biphenylene, 4,4'-diphenylene ether, p-xylylene, and 4,4'-dimethylenediphenyl ether radicals, which comprises reacting HR₂SiR'SiR₂H, where R and R' are as above defined, with an aliphatic alcohol in the presence of a catalytic quantity of metallic sodium, hydrolyzing the reaction product with an aqueous alcoholic solution of an alkali metal hydroxide containing at least 5 percent by weight of said alkali metal hydroxide, and neutralizing the resulting hydrolyzate with potassium acid phosphate.

References Cited by the Examiner

UNITED STATES PATENTS

| | | | |
|---|---|---|---|
| 2,561,429 | 7/51 | Sveda | 260—448.2 |
| 2,562,000 | 7/51 | Sveda | 260—448.2 |
| 2,624,721 | 1/53 | Hatcher et al. | 260—448.2 |
| 2,689,860 | 9/54 | Rust | 260—448.2 |
| 2,745,860 | 5/56 | Bailey | 260—448.8 |
| 2,831,011 | 4/58 | Sommer | 260—448.2 |
| 2,967,171 | 1/61 | Barnes et al. | 260—448.8 |
| 3,050,542 | 8/62 | Piccoli | 260—448.2 |
| 3,053,872 | 9/62 | Omietanski | 260—448.2 |

OTHER REFERENCES

Breed et al.: "Development of Thermally Stable Silicon Containing Resins," WADC Tech. Report 57–143 (May 1957), page 25.

Gilman et al.: "Jour. Am. Chem. Soc.," vol. 82 (July 20, 1960), pages 3605–8.

Topchiev et al.: "Doklady Akad, Nauk SSSR," vol. 109, 1956, pages 332–5 (51 Chem. Abstracts, 1826–7, 1957).

TOBIAS E. LEVOW, *Primary Examiner.*

ALPHONSO D. SULLIVAN, *Examiner.*